(12) United States Patent
Voegeli

(10) Patent No.: US 11,920,475 B2
(45) Date of Patent: Mar. 5, 2024

(54) MOTION CONVERSION ASSEMBLY FOR PUMP AND PUMP INCLUDING SAME

(71) Applicant: CV Group, LLC, Oak Harbor, WA (US)

(72) Inventor: Ronald Voegeli, Oak Harbour, WA (US)

(73) Assignee: CV GROUP, LLC, Oak Harbor, WA (US)

( * ) Notice: Subject to any disclaimer, the term of this patent is extended or adjusted under 35 U.S.C. 154(b) by 0 days.

(21) Appl. No.: 17/290,366

(22) PCT Filed: Oct. 31, 2018

(86) PCT No.: PCT/US2018/058438
§ 371 (c)(1),
(2) Date: Apr. 30, 2021

(87) PCT Pub. No.: WO2020/091761
PCT Pub. Date: May 7, 2020

(65) Prior Publication Data
US 2021/0404339 A1    Dec. 30, 2021

(51) Int. Cl.
*F01B 9/04*     (2006.01)
*F02B 75/32*    (2006.01)
*F16H 19/04*    (2006.01)

(52) U.S. Cl.
CPC .............. *F01B 9/047* (2013.01); *F02B 75/32* (2013.01); *F16H 19/043* (2013.01)

(58) Field of Classification Search
CPC ......... F01B 9/047; F02B 75/32; F16H 19/043
See application file for complete search history.

(56) References Cited

U.S. PATENT DOCUMENTS

| | | | |
|---|---|---|---|
| 4,590,812 A | 5/1986 | Brackett | |
| 5,406,859 A | 4/1995 | Belford | |
| 6,981,483 B1 | 1/2006 | Keip | |
| 2004/0261750 A1 | 12/2004 | McKeown | |
| 2011/0005480 A1* | 1/2011 | Voegeli | F01B 9/047 |
| | | | 123/53.6 |

* cited by examiner

*Primary Examiner* — Grant Moubry
*Assistant Examiner* — Ruben Picon-Feliciano
(74) *Attorney, Agent, or Firm* — Panitch Schwarze Belisario & Nadel LLP; Erin M. Dunston

(57) ABSTRACT

A motion conversion apparatus (100) comprises a rodrack assembly (110), which includes two guide members (140) and a first gear connection member (120) comprising opposing engaging arrangements (1201). The motion conversion apparatus (100) further comprises a gearshaft member (150) causing reciprocating linear motion of the rodrack assembly (110) along a reciprocation direction (D) by rotational motion of the gearshaft member (150). The gearshaft member (150) includes a second gear connection member (160) configured to engage with the first gear connection member (120), and a guiding surface arrangement (170) configured to contact a guide member (140) during rotational motion of the gearshaft member (150), wherein one gearshaft member (150) revolution causes a single period of reciprocating linear motion of the rodrack assembly (110). The guiding surface arrangement (170) contacts one of the two guide members (140) at an endpoint of the reciprocating linear motion of the rodrack assembly (110).

18 Claims, 10 Drawing Sheets

MOTION CONVERSION ASSEMBLY FOR PUMP AND PUMP INCLUDING SAME

CROSS-REFERENCE TO RELATED APPLICATIONS

This application is a U.S. National Stage Application pursuant to 35 U.S.C. § 371 of International Patent Application PCT/US2018/058438, filed on Oct. 31, 2018, and published as WO 2020/091761 on May 7, 2020, all of which are incorporated herein by reference in their entireties for all purposes.

TECHNICAL FIELD

The present disclosure relates to apparatuses for converting rotational motion to linear motion, and more particularly a motion conversion assembly for a pump and a pump including a motion conversion assembly.

BACKGROUND INFORMATION

Hydraulic fracturing typically involves pumping low volumes of fracturing fluid into a wellbore at high pressure, using a pump, sometimes referred to as a "frac pump." Frac pumps conventionally involve a powered rotational member which linearly displaces a pumping member via a crankshaft. This configuration presents several drawbacks, including a lack of energy efficiency, and uneven torque during hydraulic pumping. Unevenness of torque leads to pulsation during pumping, which is generally undesirable.

A need exists for a pump with better energy efficiency and more even torque during pumping.

Constant velocity engine designs and technologies are described in U.S. Pat. No. 8,327,819, the entire contents of which are incorporated herein by reference. Apparatuses for converting linear motion to rotational motion and vice versa are also described in International Patent Application No. PCT/US2018/022672 filed on Mar. 15, 2018 and International Patent Application No. PCT/US2018/022672 filed on Aug. 30, 2018, the entire contents of which are incorporated herein by reference.

SUMMARY

A motion conversion apparatus is disclosed. The motion conversion apparatus comprises a first gear connection member which includes opposing engaging arrangements. The first gear connection member further comprises a rodrack assembly including two guide members. The motion conversion apparatus further comprises a gearshaft member configured to cause reciprocating linear motion of the rodrack assembly along a reciprocation direction by rotational motion of the gearshaft member about a rotational axis. The gearshaft member includes a second gear connection member configured to engage with the first gear connection member during the rotational motion of the gearshaft member, and a guiding surface arrangement configured to contact either one of the two guide members during the rotational motion of the gearshaft member, wherein one revolution of the gearshaft member causes a single period of reciprocating linear motion of the rodrack assembly. The guiding surface arrangement is configured to contact one of the two guide members at an endpoint of the reciprocating linear motion of the rodrack assembly.

BRIEF DESCRIPTION OF THE DRAWINGS

Other features and advantages disclosed herein will become more apparent from the following detailed description of exemplary embodiments when read in conjunction with the attached drawings.

DETAILED DESCRIPTION

Figure 1:
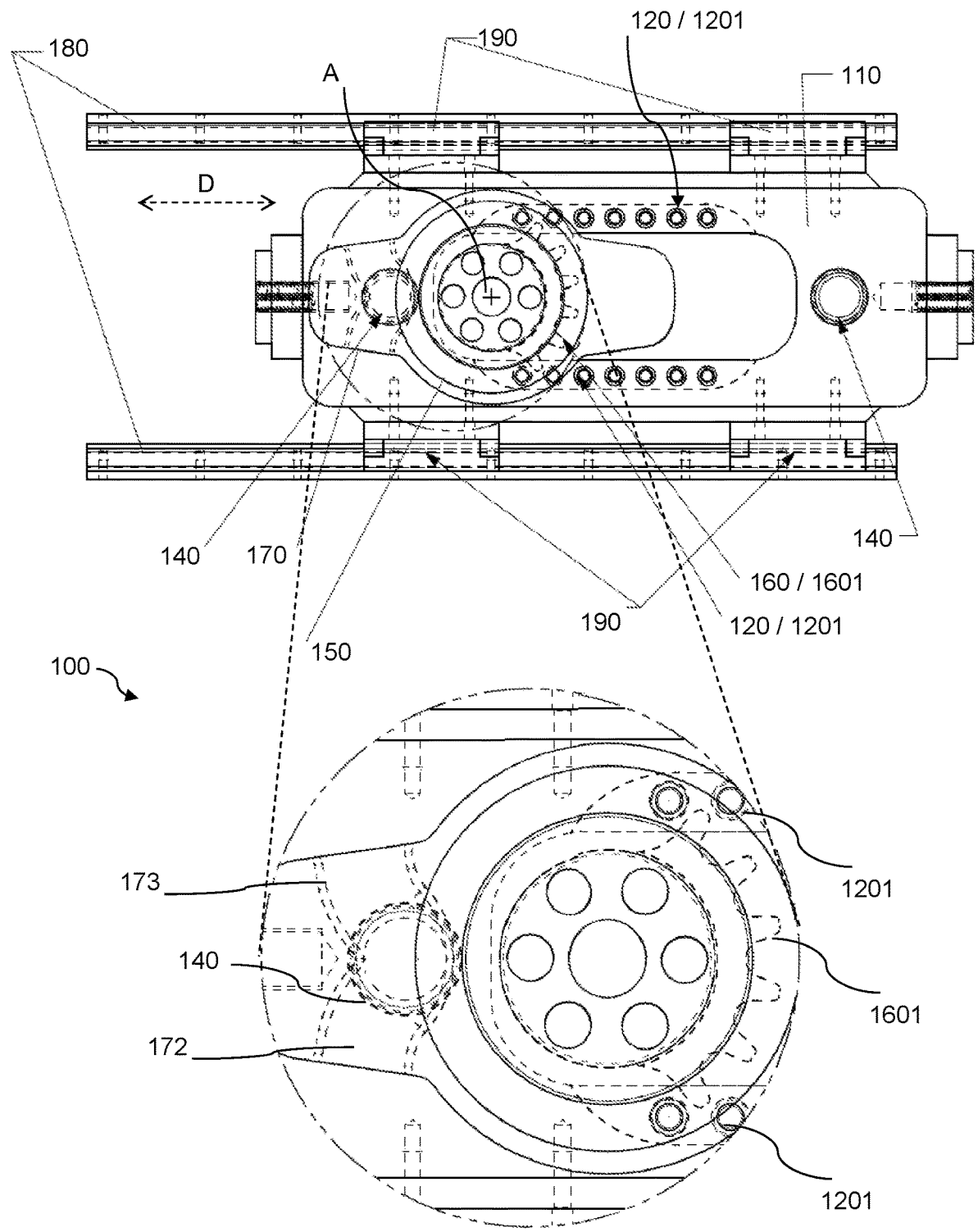
FIG. 1 is a schematic illustration of an exemplary embodiment of a motion conversion apparatus.

FIG. 1 shows an exemplary embodiment of a motion conversion apparatus 100.

In an exemplary embodiment, the motion conversion apparatus 100 comprises a rodrack assembly 110. The rodrack assembly 110 comprises a first gear connection member 120 and two guide members 140.

In an exemplary embodiment, the first gear connection member 120 comprises opposing engaging arrangements 1201. In FIG. 1, the engaging arrangements 1201 are shown as pins. In exemplary embodiments, the engaging arrangements 1201 can include one or more teeth, grooves, sprockets, and/or sprocket engagement rollers, and/or any other engaging arrangements known in the art.

In an exemplary embodiment, the motion conversion apparatus 100 comprises a gearshaft member 150 configured to cause reciprocating linear motion of the rodrack assembly 110 along a reciprocation direction D by rotational motion of the gearshaft member 150 about a rotational axis A.

In an exemplary embodiment, the gearshaft member 150 comprises a guiding surface arrangement 170 configured to contact either one of the two guide members 140 during the rotational motion of the gearshaft member 150, and a second gear connection member 160 configured to engage with the first gear connection member 120 during the rotational motion of the gearshaft member 150.

In an exemplary embodiment, the guiding surface arrangement 170 is configured to contact one of the two guide members 140 at an endpoint of the reciprocating linear motion of the rodrack assembly 110.

In an exemplary embodiment, the motion conversion apparatus 100 is configured such one revolution of the gearshaft member 150 causes a single period of reciprocating linear motion of the rodrack assembly 110.

In an exemplary embodiment, the second gear connection member 160 engages with only one of the opposing engaging arrangements 1201 at a time during the reciprocating linear motion of the rodrack assembly 110.

In an exemplary embodiment, the second gear connection member 160 includes engaging members 1601. In FIG. 1, the engaging members 1601 are shown as teeth. In exemplary embodiments, the engaging members 1601 can include one or more teeth, grooves, sprockets, and/or sprocket engagement rollers, and/or any other engaging arrangements known in the art.

In an exemplary embodiment, the engaging members 1601 span less than the circumference of the second gear connection member 160. As such, the second gear connection member 160 can engage with a single one of the engaging arrangements 1201 of the first gear connection member 120 at a time, without engaging with the other engaging arrangement 1201 of the first gear connection member 120. In an exemplary embodiment, the engaging members 1601 span half or less than half of the circumference of the second gear connection member 160.

In an exemplary embodiment, the guiding surface arrangement 170 comprises wall surfaces 173 of a groove 172.

In an exemplary embodiment, each of the two guide members 140 includes two opposite ends which each protrude from opposite sides of the rodrack 110 embodying the first gear connection member 120.

In an exemplary embodiment, the two guide members 140 include two shafts.

In an exemplary embodiment, each of the two shafts is configured to spin along a longitudinal axis thereof. For example, each shaft can be attached to their supporting structure by bearing engagements or other mechanisms for allowing rotation of the shaft.

In an exemplary embodiment, at least a portion of the gearshaft member 150 is located between the opposing engaging arrangements 1201 and between the two guide members 140.

In an exemplary embodiment, the second gear connection member 160 extends through the reciprocating rodrack assembly 110.

In an exemplary embodiment, the motion conversion apparatus 100 is configured such that constant rotation of the gearshaft member 150 results in constant linear speed of the rodrack assembly 110 during at least a portion of the reciprocating linear motion of the rodrack assembly 110. This can be particularly advantageous, for example, when pumping low volumes at high pressure. For example, constant linear speed of the rodrack assembly might reduce pulsation and increase efficiency during pumping.

In an exemplary embodiment, the gearshaft member 150 may include a central hole extending through the second gear connection member 160.

In an exemplary embodiment, the first gear connection member 120 is located between at least one pair of opposing pistons 130 (shown in FIG. 4) along the reciprocation direction D, the opposing pistons 130 being configured to reciprocate along the reciprocation direction D.

In an exemplary embodiment, the motion conversion apparatus 100 is configured such that one revolution of the gearshaft member 150 causes two strokes of the opposing pistons 130.

In an exemplary embodiment, the second gear connection member 160 is located between the two guide members 140.

In an exemplary embodiment, the motion conversion apparatus 100 further comprises at least one rail 180, and the rodrack assembly 110 is configured to be displaced along the rail 180 during the reciprocating linear motion of the rodrack assembly 110.

In an exemplary embodiment, the motion conversion apparatus 100 further comprises at least one bracket 190 of the rodrack assembly 110 which slides along the rail 180 during the reciprocating linear motion of the rodrack assembly 110.

Figure 2A:
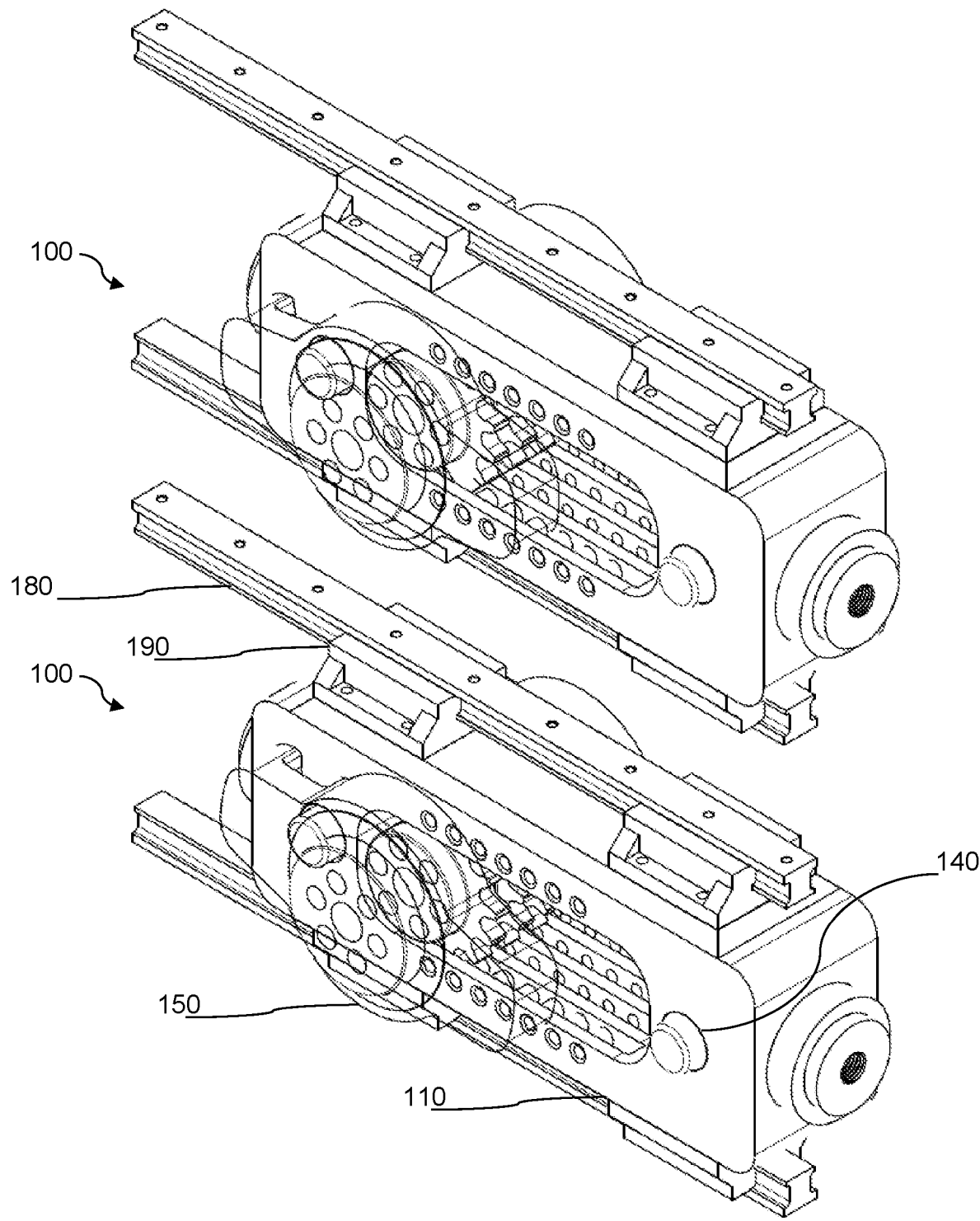
FIGS. 2A-B are schematic illustrations of exemplary embodiments of a motion conversion apparatus during operation.
Figure 2B:
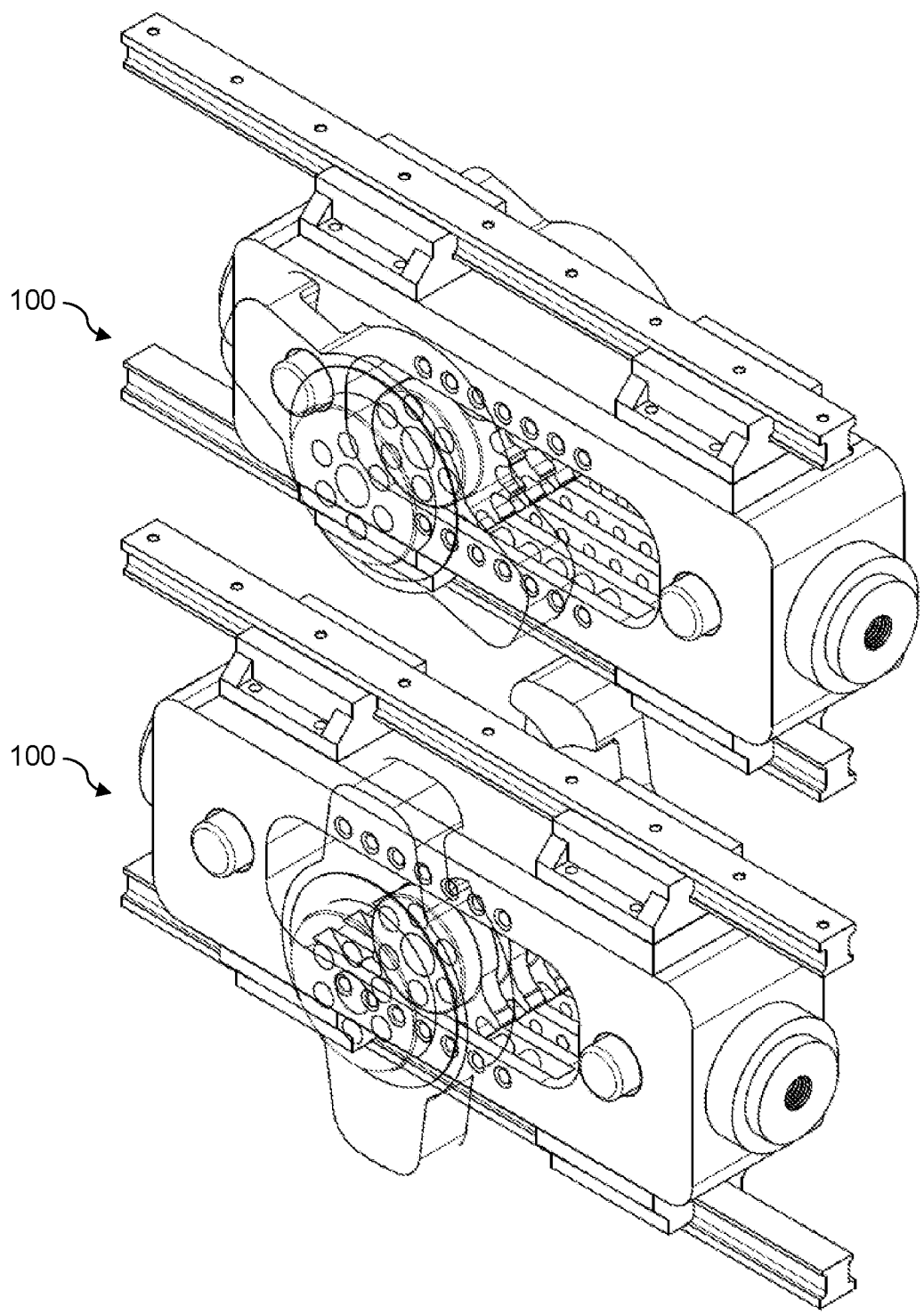

FIGS. 2A-B show exemplary embodiments of a motion conversion apparatus 100 during operation, over a 90-degree revolution of the gearshaft member 150.

Figure 3A:
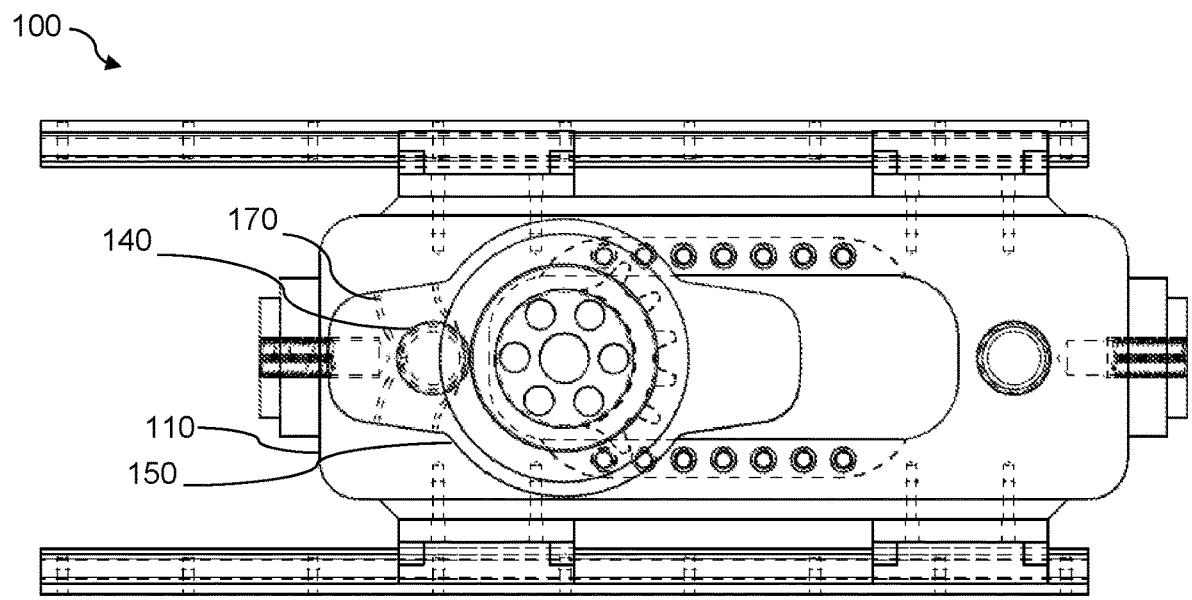
FIGS. 3A-L are schematic illustrations of an exemplary embodiment of a motion conversion apparatus during operation over one clockwise revolution of the gearshaft member.
Figure 3B:
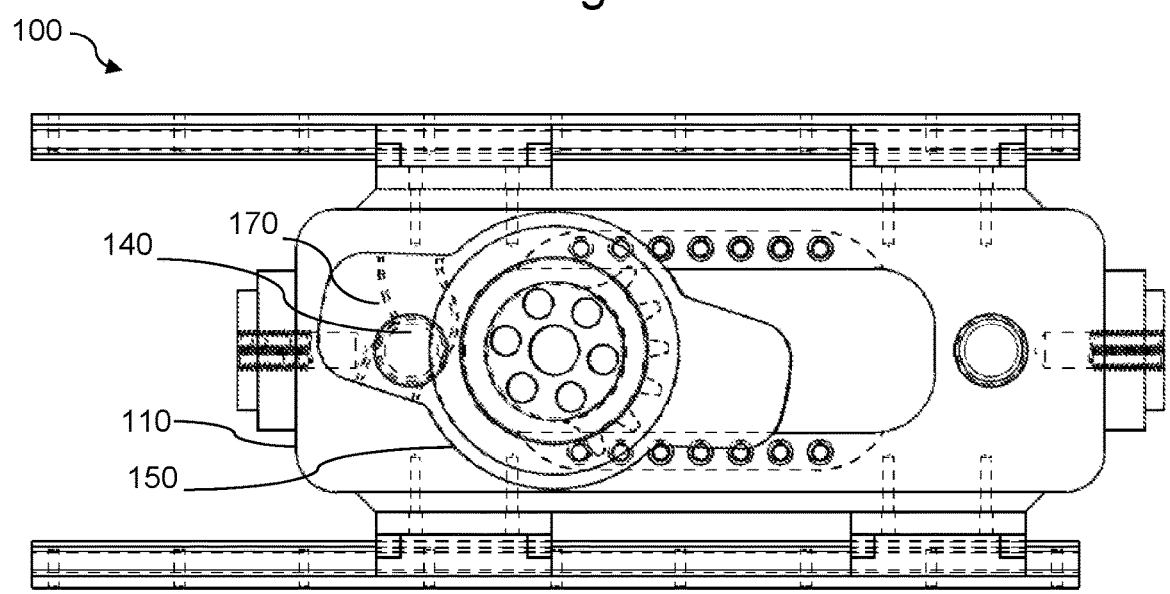

FIGS. 3A-L show an exemplary embodiment of a motion conversion apparatus 100 during operation over one clockwise revolution of the gearshaft member 150, and thus one period of reciprocating linear motion of the rodrack assembly 110. A 180-degree rotation of the gearshaft member 150 can be defined from Top Dead Center (TDC) to Bottom Dead Center (BDC). One clockwise revolution of the gearshaft member 150 thus includes displacement from TDC to BDC and back to TDC. In FIG. 1, the left-most guide member 140 is centered in the guiding surface arrangement 170 at TDC. FIG. 3A also shows the motion conversion apparatus 100 at TDC.

Figure 3C:
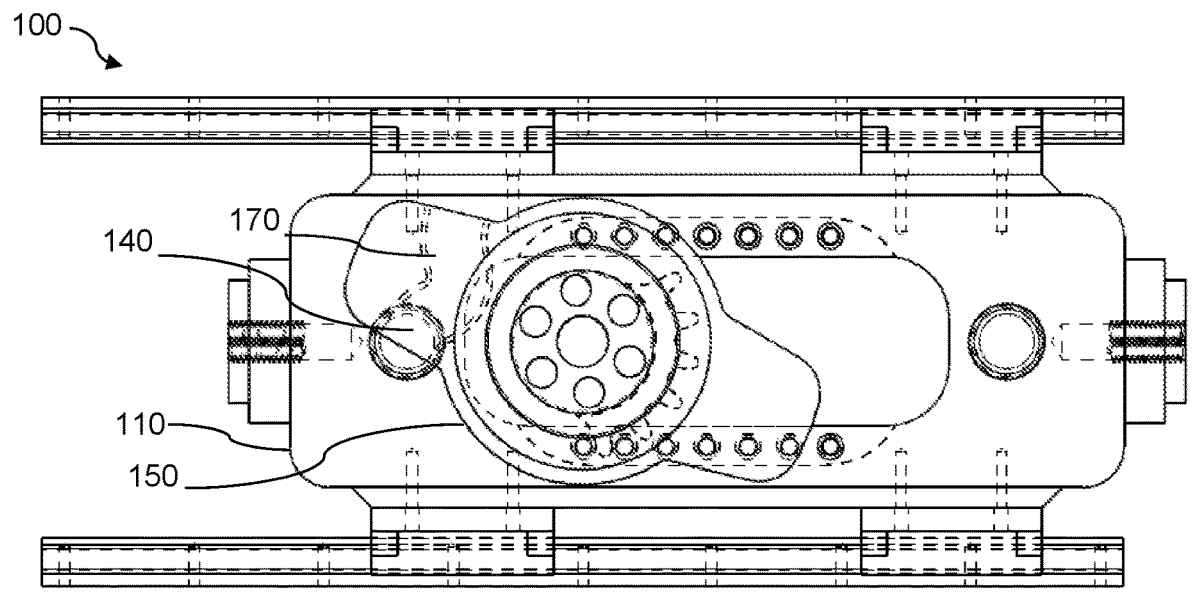
Figure 3D:
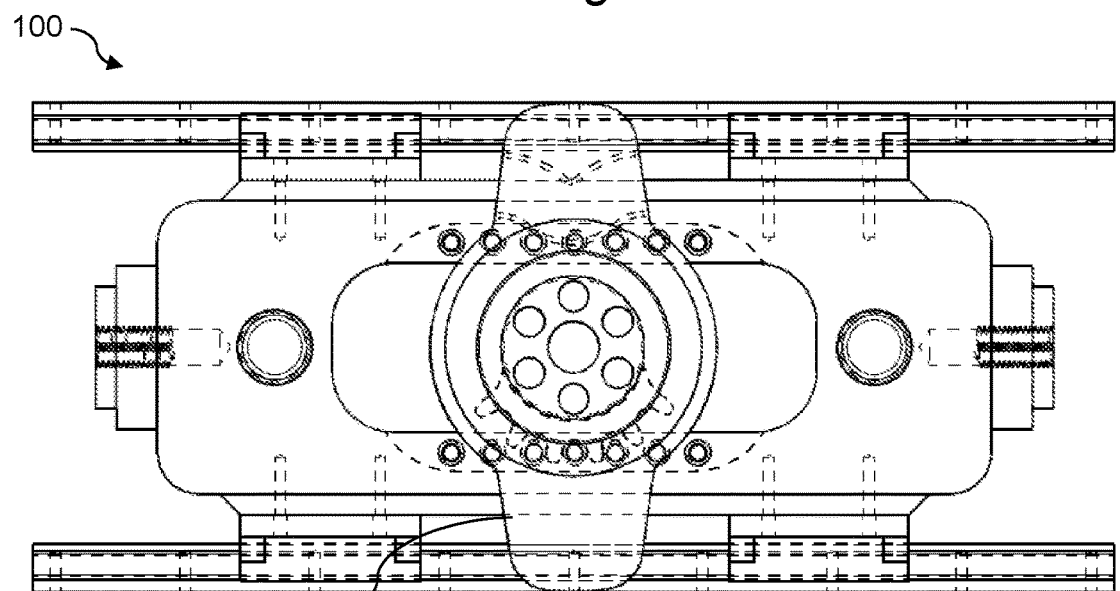

In an exemplary embodiment, as shown in FIGS. 3C-D, the guiding surface arrangement 170 disengages with the left-most guide member 140 shortly before reaching 90 degrees of rotation of the gearshaft member 150. FIG. 3G shows an exemplary embodiment of the motion conversion apparatus 100 after 90 degrees of rotation of the gearshaft member 150.

Figure 3E:
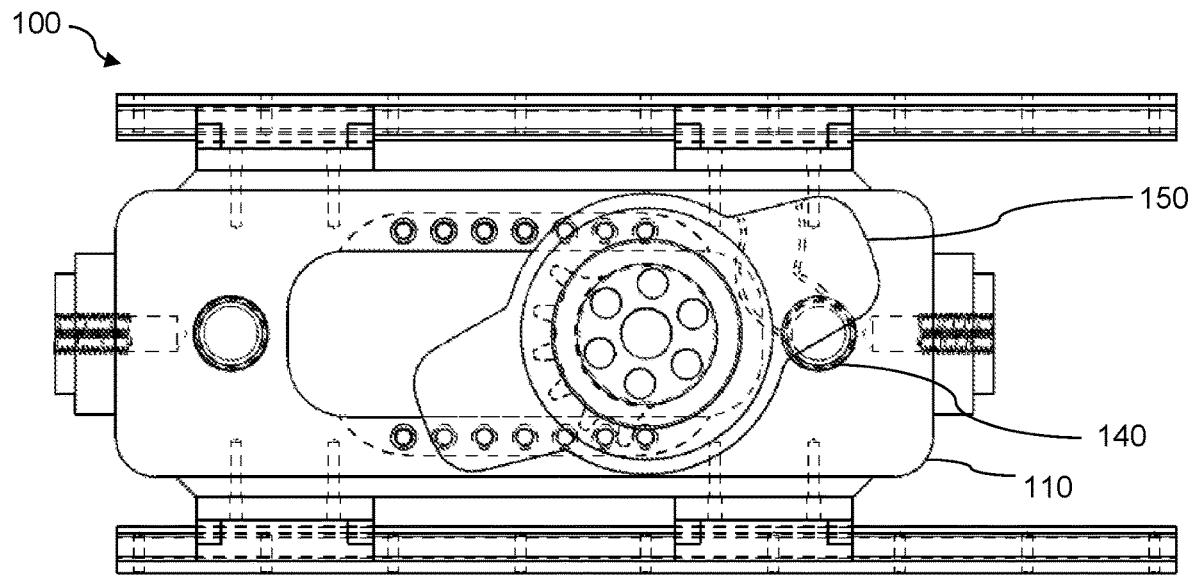
Figure 3F:
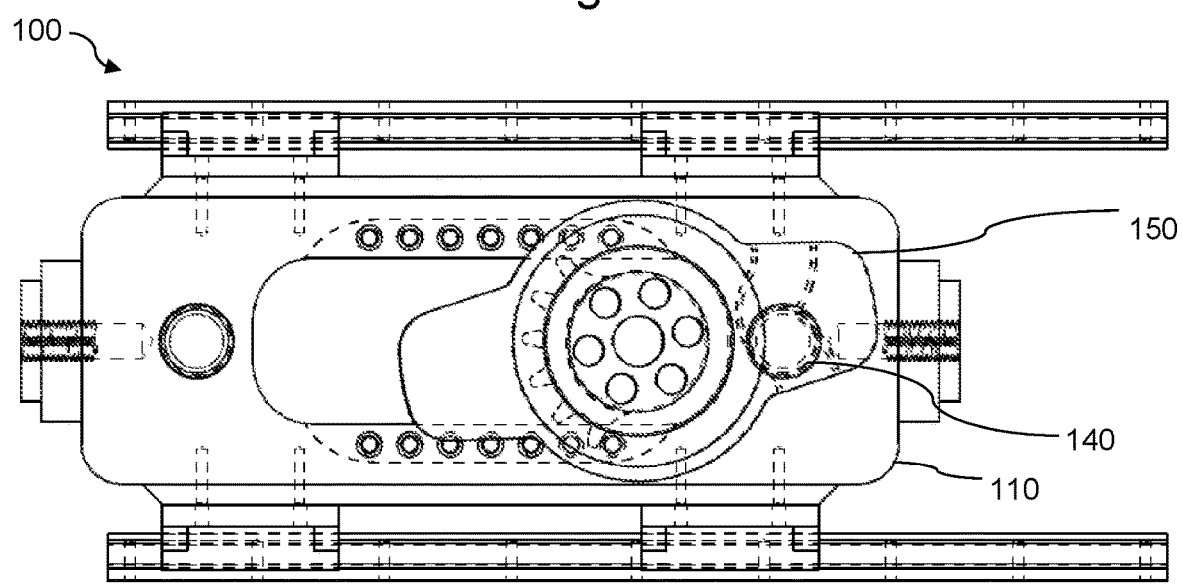
Figure 3G:
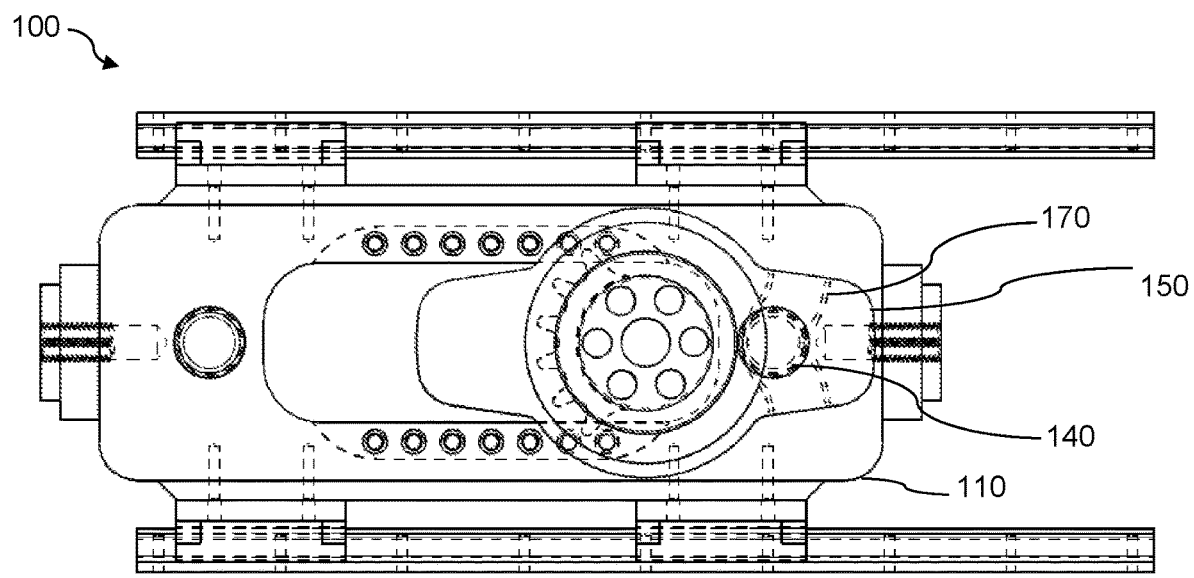
Figure 3H:
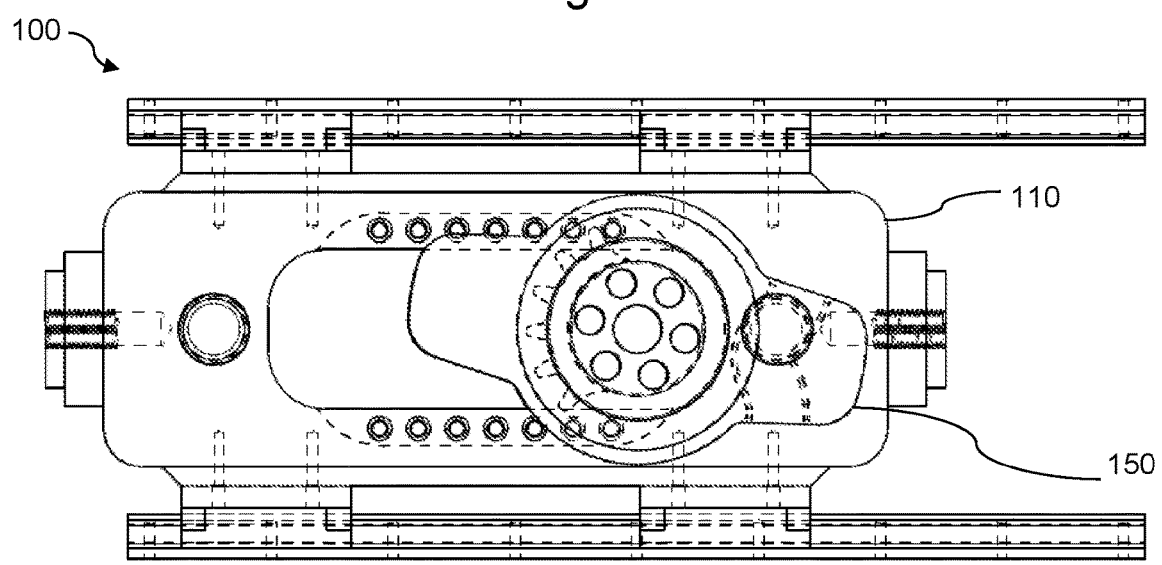
Figure 3I:
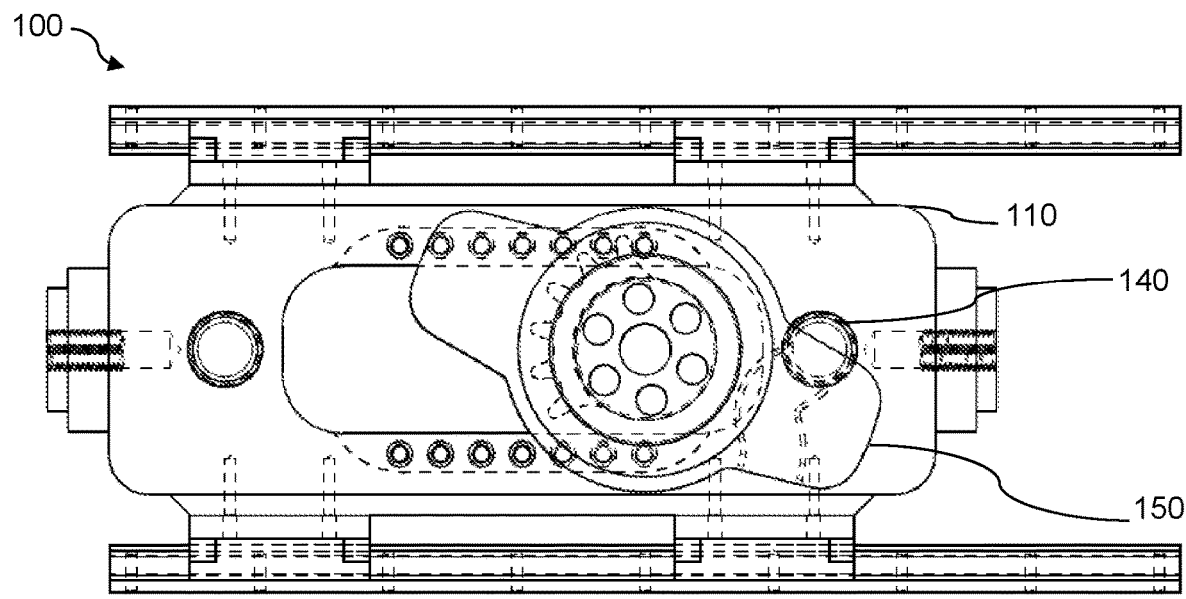
Figure 3J:
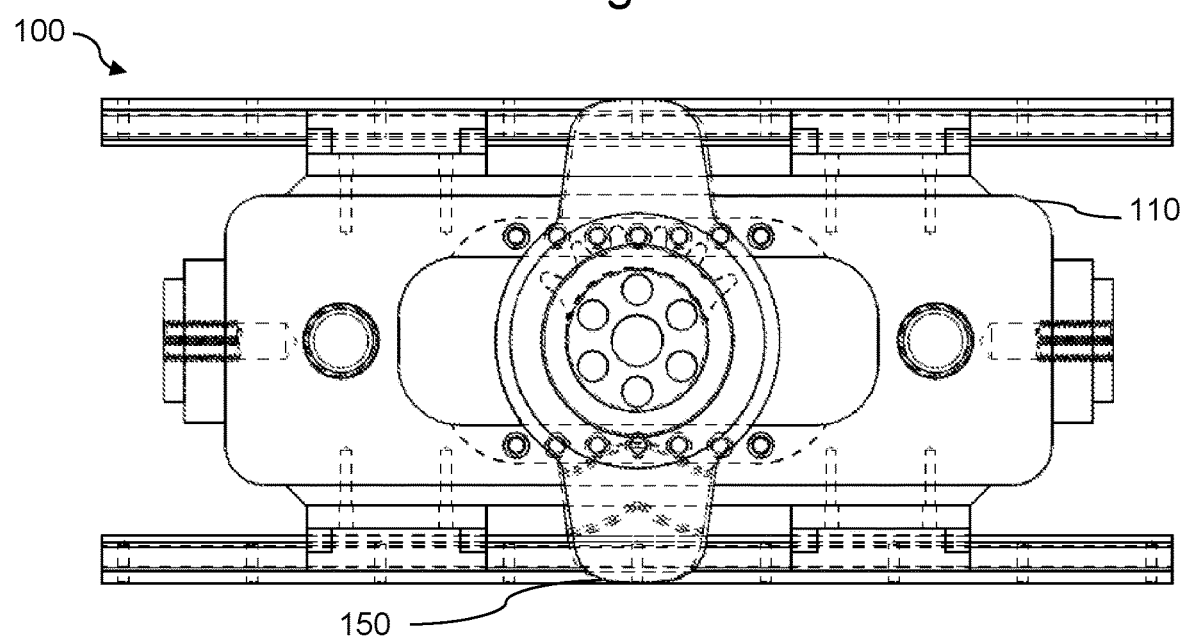
Figure 3K:
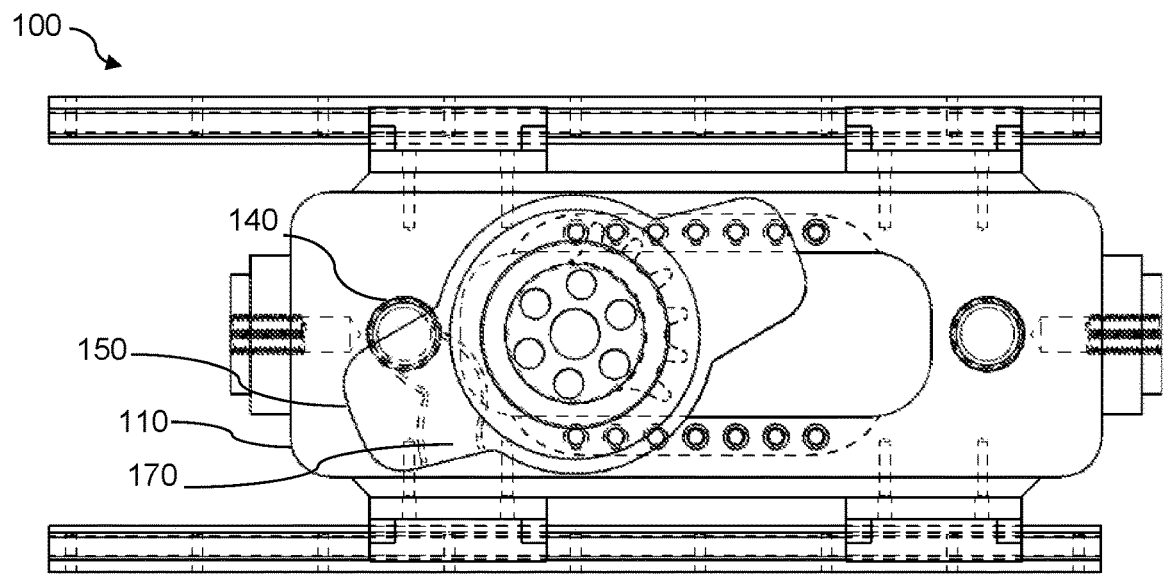

In an exemplary embodiment, as shown in FIGS. 3E-G, the guiding surface arrangement 170 engages with the right-most guide member 140 shortly thereafter, and then complete a 180-degree rotation to BDC. FIG. 3G shows an exemplary embodiment of the motion conversion apparatus 100 at BDC, with the right-most guide member 140 centered in the guiding surface arrangement 170. At BDC, the rodrack assembly 110 has completed its rightward displacement.

Figure 3L:
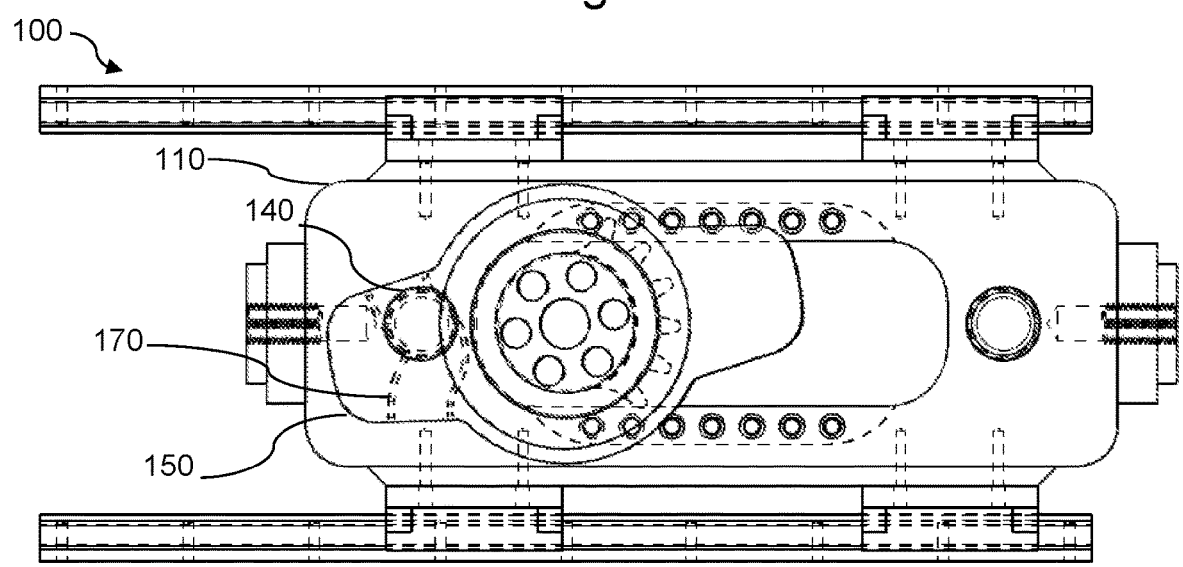

FIGS. 3H-L illustrate the operation of an exemplary embodiment of the motion conversion apparatus 100 as the rodrack assembly 110 travels leftward, with FIG. 3L showing an exemplary embodiment of the motion conversion apparatus 100 just before reaching TDC and completing one clockwise revolution of the gearshaft member 150 (and thus one period of reciprocating linear motion of the rodrack assembly 110).

In exemplary embodiments, the motion conversion apparatus 100 can form a part of a pump assembly (such as, but not limited to a hydraulic fracturing pump), a compressor assembly, or any other device involving rotational-to-linear motion conversion.

Figure 4:
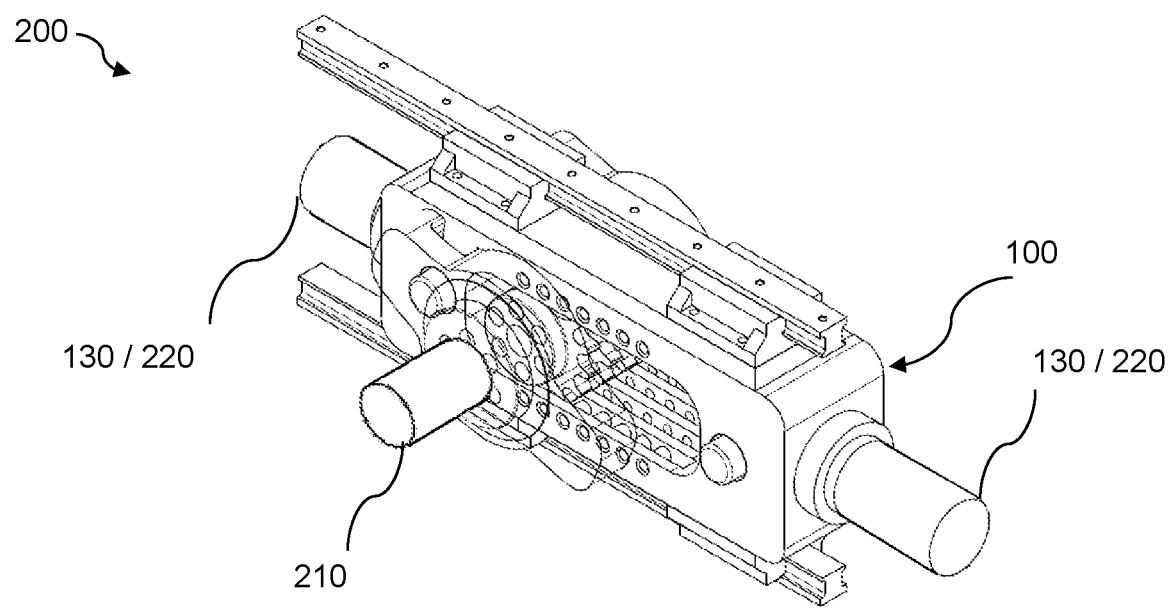
FIG. 4 is a schematic illustration of an exemplary embodiment of a pump assembly including a motion conversion apparatus.

FIG. 4 shows an exemplary embodiment of a pump assembly 200 comprising the motion conversion apparatus 100. The pump assembly 200 further comprises at least one pumping member 220 coupled to a respective end of the rodrack assembly 110 along the reciprocation direction D. The reciprocating linear motion of the rodrack assembly 110 causes reciprocating linear motion of the at least one pumping member 220. In exemplary embodiments, a pumping member 220 includes a piston or any other component known in the art which pumps a fluid or semifluid substance.

In exemplary embodiments, the pump assembly 200 further comprises a motor 210 configured to cause rotation of the gearshaft member 150 and thereby cause the reciprocating linear motion of the rodrack assembly 110. In exemplary embodiments, the motor 210 can be powered electrically, by fuel combustion, or by any other mechanisms known in the art to power a motor.

Figure 5:
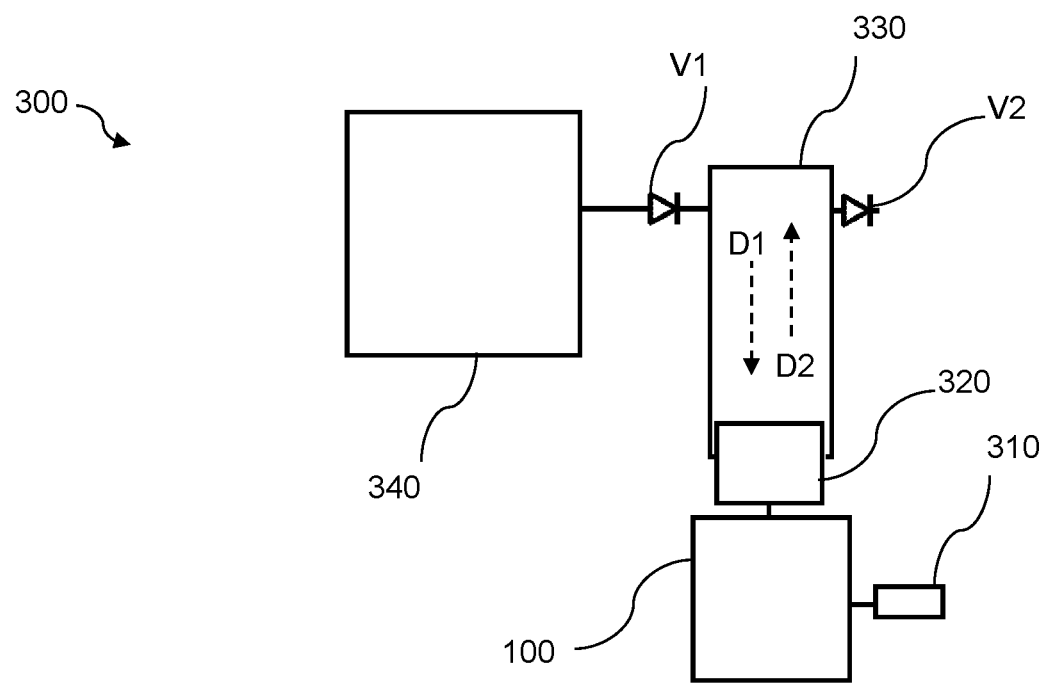
FIG. 5 is a schematic illustration of an exemplary embodiment of a pump assembly including a motion conversion apparatus.

FIG. 5 shows an exemplary embodiment of a pump assembly 300 comprising a motion conversion apparatus 100, a motor 310 configured to cause the reciprocating linear motion of the rodrack assembly of the motion conversion apparatus 100, a piston 320 coupled to one end of the rodrack assembly of the motion conversion apparatus and reciprocating inside a piston chamber 330, and a fluid chamber 340. The fluid chamber 340 is in fluid communication with the piston chamber 330 via a first one-way valve V1. The pump assembly 300 is configured such that the motor 310 causes reciprocating motion of the piston 320 in the piston chamber 330, displacement of the piston 320 in a first direction D1 in the piston chamber 330 causes fluid or semifluid to travel from the fluid chamber 340 into the piston chamber 330, and displacement of the piston 320 in a second direction D2 in the piston chamber 330 causes the fluid or semifluid to travel out of the piston chamber 330 through a second one-way valve V2. Of course, the disclosure is not limited to the configuration of FIG. 5, as other pump configurations using reciprocating members are also known in the art, and an ordinarily skilled artisan would be able to adapt such known pump configurations to the motion conversion apparatus 100.

In exemplary embodiments, a pump assembly or any device involving rotational-to-linear motion conversion can include any combinations of the above-described features.

It will be appreciated by those skilled in the art that the disclosure herein can be embodied in other specific forms without departing from the spirit or essential characteristics thereof. Moreover, those skilled in the art will appreciate that the various features described herein can be combined in any arbitrary combination. The presently disclosed embodiments are therefore considered in all respects to be exemplary and not restricted. The scope of the invention is indicated by the appended claims rather than the foregoing description and all changes that come within the meaning and range and equivalence thereof are intended to be embraced therein.

What is claimed is:

1. A motion conversion apparatus comprising:
    a rodrack assembly comprising a first gear connection member and two guide members, the first gear connection member comprising first and second, opposing engaging arrangements; and
    a gearshaft member configured to cause reciprocating linear motion of the rodrack assembly along a reciprocation direction by rotational motion of the gearshaft member about a rotational axis,
    the gearshaft member comprising a guiding surface arrangement configured to contact either one of the two guide members during the rotational motion of the gearshaft member, and a second gear connection member configured to engage with the first gear connection member during the rotational motion of the gearshaft member, the first engaging arrangement, the second engaging arrangement and the second gear connection member being coplanar, wherein within a first half of a revolution of the gearshaft member an entirety of the second gear connection member engages the first engaging arrangement and within a second half of the revolution of the gearshaft member the entirety of the second gear connection member engages the second engaging arrangement, whereby one revolution of the gearshaft member causes a single period of reciprocating linear motion of the rodrack assembly,
    the guiding surface arrangement being configured to contact one of the two guide members at an endpoint of the reciprocating linear motion of the rodrack assembly.

2. The motion conversion apparatus according to claim 1, wherein the second gear connection member engages with only one of the opposing engaging arrangements at a time during the reciprocating linear motion of the rodrack assembly.

3. The motion conversion apparatus according to claim 1, wherein the second gear connection member includes engaging members spanning less than a circumference of the second gear connection member.

4. The motion conversion apparatus according to claim 1, wherein the guiding surface arrangement comprises wall surfaces of a groove.

5. The motion conversion apparatus according to claim 1, wherein each of the two guide members includes two opposite ends which each protrude from opposite sides of the first gear connection member.

6. The motion conversion apparatus according to claim 1, wherein the two guide members include two shafts.

7. The motion conversion apparatus according to claim 6, wherein each of the two shafts is configured to spin along a longitudinal axis thereof.

8. The motion conversion apparatus according to claim 1, wherein at least a portion of the gearshaft member is located between the first and second, opposing engaging arrangements and between the two guide members.

9. The motion conversion apparatus according to claim 1, wherein the second gear connection member extends through the reciprocating rodrack assembly.

10. The motion conversion apparatus according to claim 1, configured such that constant rotation of the gearshaft member results in constant linear speed of the rodrack assembly during at least a portion of the reciprocating linear motion of the rodrack assembly.

11. The motion conversion apparatus according to claim 1, wherein the gearshaft member includes a central hole extending through the second gear connection member.

12. The motion conversion apparatus according to claim 1, wherein the first gear connection member is located between at least one pair of opposing pistons along the reciprocation direction, the opposing pistons being configured to reciprocate along the reciprocation direction.

13. The motion conversion apparatus according to claim 12, configured such that one revolution of the gearshaft member causes two strokes of the opposing pistons.

14. The motion conversion apparatus according to claim 1, wherein the second gear connection member is located between the two guide members.

15. The motion conversion apparatus according to claim 1, further comprising at least one rail, and wherein the rodrack assembly is configured to be displaced along the at least one rail during the reciprocating linear motion of the rodrack assembly.

16. The motion conversion apparatus according to claim 15, further comprising at least one bracket of the rodrack assembly which slides along the least one rail during the reciprocating linear motion of the rodrack assembly.

17. A pump assembly comprising:
    the motion conversion apparatus according to claim 1; and
    at least one pumping member coupled to a respective end of the rodrack assembly along the reciprocation direction,
    wherein the reciprocating linear motion of the rodrack assembly causes reciprocating linear motion of the at least one pumping member.

18. The pump assembly according to claim 17, further comprising a motor configured to cause rotation of the gearshaft member and thereby cause the reciprocating linear motion of the rodrack assembly.

* * * * *